United States Patent
McGrady et al.

(10) Patent No.: US 8,709,563 B2
(45) Date of Patent: *Apr. 29, 2014

(54) ELECTRICAL CONDUIT CONTAINING A FIRE-RESISTING THERMOPLASTIC COMPOSITION

(75) Inventors: Christopher McGrady, Florence, KY (US); Kaushik Chakrabarty, Florence, KY (US); David McIlroy, Cincinnati, OH (US); Xinyu Zhao, Cincinnati, OH (US)

(73) Assignee: Ticona LLC, Florence, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/602,529

(22) Filed: Sep. 4, 2012

(65) Prior Publication Data

US 2013/0084415 A1    Apr. 4, 2013

Related U.S. Application Data

(60) Provisional application No. 61/541,364, filed on Sep. 30, 2011.

(51) Int. Cl.
*B29C 47/00* (2006.01)

(52) U.S. Cl.
USPC ......... 428/36.9; 524/115; 524/430; 174/68.3; 428/36.92

(58) Field of Classification Search
USPC .......... 428/36.91, 36.9, 36.92; 524/405, 406, 524/115–154; 174/68.3
See application file for complete search history.

(56) References Cited

U.S. PATENT DOCUMENTS

| | | | |
|---|---|---|---|
| 5,227,427 A | 7/1993 | Serizawa et al. |
| 5,288,817 A | 2/1994 | Yamamoto et al. |
| 5,310,776 A | 5/1994 | Takagi et al. |
| 5,324,796 A | 6/1994 | Han |
| 5,342,920 A | 8/1994 | Imai et al. |
| 5,358,786 A | 10/1994 | Ishikawa et al. |
| 5,385,970 A | 1/1995 | Gallucci et al. |
| 5,430,081 A | 7/1995 | Ohmae et al. |
| 5,500,471 A | 3/1996 | Uota |
| 5,541,243 A | 7/1996 | Ohmura et al. |
| 5,578,679 A | 11/1996 | Suzuki et al. |
| 5,770,644 A | 6/1998 | Yamamoto et al. |

(Continued)

FOREIGN PATENT DOCUMENTS

| | | |
|---|---|---|
| EP | 0 222 199 A1 | 5/1987 |
| EP | 1 466 946 A1 | 10/2004 |

(Continued)

OTHER PUBLICATIONS

Abstract of Chinese Patent—CN101397396 dated Apr. 1, 2009, 1 page.

(Continued)

*Primary Examiner* — N. Edwards
(74) *Attorney, Agent, or Firm* — Dority & Manning, P.A.

(57) ABSTRACT

An electrical conduit that contains a jacket that defines a hollow passageway is provided. At least a portion of the jacket is formed from a thermoplastic composition that contains a polyarylene sulfide and fire-resisting system. Due in part to the specific nature and concentration of these components, the present inventors have discovered that the resulting thermoplastic composition may have a relatively high melting temperature, such as from about 200° C. to about 500° C.

30 Claims, 1 Drawing Sheet

(56) References Cited

U.S. PATENT DOCUMENTS

| | | | |
|---|---|---|---|
| 5,777,069 A | | 7/1998 | Tsuda et al. |
| 5,789,533 A | | 8/1998 | Yamanaka et al. |
| 5,841,073 A | | 11/1998 | Randa et al. |
| 5,879,813 A | * | 3/1999 | Tanaka et al. ................. 428/483 |
| 5,936,205 A | | 8/1999 | Newmoyer |
| 6,013,707 A | | 1/2000 | Kleiner et al. |
| 6,096,914 A | | 8/2000 | Seitz |
| 6,174,943 B1 | | 1/2001 | Matsumoto et al. |
| 6,194,605 B1 | | 2/2001 | Kleiner |
| 6,270,560 B1 | | 8/2001 | Kleiner et al. |
| 6,316,536 B1 | | 11/2001 | Okamoto et al. |
| 6,365,071 B1 | | 4/2002 | Jenewein et al. |
| 6,388,003 B1 | | 5/2002 | Okamoto et al. |
| 6,566,488 B2 | | 5/2003 | Okamoto et al. |
| 6,716,899 B1 | | 4/2004 | Klatt et al. |
| 6,803,090 B2 | * | 10/2004 | Castiglione et al. .......... 428/172 |
| 7,087,666 B2 | | 8/2006 | Hoerold et al. |
| 7,087,667 B2 | | 8/2006 | Yamanaka et al. |
| 7,115,677 B2 | | 10/2006 | Harashina et al. |
| 7,160,609 B2 | | 1/2007 | Wakizaka et al. |
| 7,250,469 B2 | | 7/2007 | Tsutsumi et al. |
| 7,255,814 B2 | | 8/2007 | Hoerold et al. |
| 7,256,351 B2 | | 8/2007 | Dillon et al. |
| 7,259,200 B2 | * | 8/2007 | Bauer et al. ................... 524/126 |
| 7,317,043 B2 | | 1/2008 | Nakamura et al. |
| 7,411,013 B2 | | 8/2008 | Harashina et al. |
| 7,435,769 B2 | | 10/2008 | Kishimoto et al. |
| 7,498,368 B2 | | 3/2009 | Harashina et al. |
| 7,498,375 B2 | | 3/2009 | Harashina et al. |
| 7,678,852 B2 | | 3/2010 | Kaprinidis |
| 7,696,437 B2 | | 4/2010 | Clark et al. |
| 7,750,111 B2 | | 7/2010 | Horiuchi et al. |
| 7,786,197 B2 | | 8/2010 | Yamanaka et al. |
| 7,851,528 B2 | | 12/2010 | Kanno et al. |
| 7,891,382 B2 | | 2/2011 | Rushlander et al. |
| 7,893,132 B2 | | 2/2011 | Sultan et al. |
| 7,893,380 B2 | | 2/2011 | Moore |
| 7,910,655 B2 | | 3/2011 | Baek et al. |
| 8,039,535 B2 | | 10/2011 | Lee et al. |
| 8,044,126 B2 | | 10/2011 | Yoshino et al. |
| 8,367,754 B2 | | 2/2013 | Lee et al. |
| 8,579,624 B2 | * | 11/2013 | Sutton et al. ................... 425/296 |
| 2003/0211291 A1 | * | 11/2003 | Castiglione et al. .......... 428/172 |
| 2004/0254270 A1 | * | 12/2004 | Harashina ....................... 524/86 |
| 2005/0004292 A1 | * | 1/2005 | Harashina et al. ............ 524/430 |
| 2005/0089688 A1 | | 4/2005 | Mungioli et al. |
| 2005/0143503 A1 | * | 6/2005 | Bauer et al. ................... 524/115 |
| 2005/0194578 A1 | | 9/2005 | Morris |
| 2006/0293459 A1 | * | 12/2006 | Yoshimoto et al. ........... 525/199 |
| 2007/0135540 A1 | | 6/2007 | Taguchi |
| 2008/0237194 A1 | | 10/2008 | Moore et al. |
| 2009/0253837 A1 | | 10/2009 | Takagi et al. |
| 2009/0275683 A1 | | 11/2009 | Lee et al. |
| 2010/0113654 A1 | | 5/2010 | Sugata et al. |
| 2011/0054086 A1 | | 3/2011 | Siebecker et al. |
| 2011/0257313 A1 | * | 10/2011 | Seki ............................... 524/126 |
| 2013/0081850 A1 | * | 4/2013 | McGrady et al. ............. 174/68.3 |
| 2013/0084415 A1 | * | 4/2013 | McGrady et al. ........... 428/36.91 |

FOREIGN PATENT DOCUMENTS

| | | | |
|---|---|---|---|
| EP | 2256167 A1 | * | 12/2010 |
| EP | 2 361 952 A1 | | 8/2011 |
| WO | WO 2005/052051 A1 | | 6/2005 |
| WO | WO 2007/057311 A1 | | 5/2007 |

OTHER PUBLICATIONS

Abstract of Japanese Patent—JPH0516720 dated Jan. 26, 1993, 2 pages.
Abstract of Japanese Patent—JPH06186498 dated Jul. 8, 1994, 2 pages.
Abstract of Japanese Patent—JPH093319 dated Jan. 7, 1997, 2 pages.
Abstract of Japanese Patent—JPH10353705 dated Feb. 24, 1998, 1 page.
Abstract of Japanese Patent—JPH1077396 dated Mar. 24, 1998, 1 page.
Abstract of Japanese Patent—JP2000129585 dated May 9, 2000, 2 pages.
Abstract of Japanese Patent—JP2000273293 dated Oct. 3, 2000, 2 pages.
Abstract of Japanese Patent—JP2002088253 dated Mar. 27, 2002, 1 page.
Abstract of Japanese Patent—JP2002220519 dated Aug. 9, 2002, 1 page.
Abstract of Japanese Patent—JP2002226684 dated Aug. 14, 2002, 1 page.
Abstract of Japanese Patent—JP2002235003 dated Aug. 23, 2002, 1 page.
Abstract of Japanese Patent—JP2004307533 dated Nov. 4, 2004, 2 pages.
Abstract of Japanese Patent—JP4211712 dated Jan. 21, 2009, 2 pages.
Abstract of Japanese Patent—JP2009132935 dated Jun. 18, 2009, 1 page.
Abstract of Korean Patent—KR20040079807 dated Sep. 16, 2004, 2 pages.
Abstract of Korean Patent—KR20090072936 dated Jul. 2, 2009, 1 page.
Search Report and Written Opinion for PCT/US2012/053627 dated Nov. 15, 2012, 9 pages.
Poly(phenylene sulfide) General Properties, Polymers: A Property Database; CHEMnewBase, http://www.polymersdatabase.com as view on Oct. 29, 2013.
Aluminum Diethylphosphinate Information, ChemBlink, http://www.chemblink.com/products/225789-38-8-htm as viewed on Oct. 28, 2013.

* cited by examiner

ELECTRICAL CONDUIT CONTAINING A FIRE-RESISTING THERMOPLASTIC COMPOSITION

RELATED APPLICATIONS

The present application claims priority to U.S. Provisional Application Ser. No. 61/541,364, filed on Sep. 30, 2011, which is incorporated herein in its entirety by reference thereto.

BACKGROUND OF THE INVENTION

Electrical cables are widely used in telecommunications applications for the transmission of voice, video and data signals. Such cables typically include a conductive cable core surrounded by a jacket that provides mechanical strength and protection to the cable core. Polyvinyl chloride ("PVC") is commonly used as a cable insulating and jacketing material because it is inexpensive and flexible, even at lower temperatures. However, PVC produces considerable amounts of smoke and releases toxic halogen compounds when it burns. To reduce the risk of fire propagating through a building's ductwork, safety codes often require that plenum-rated cables meet industry standards for low smoke generation and low flame spread. To successfully achieve a plenum rating, cables are constructed of materials that are more fire resistant and produce less smoke than traditional jacket materials. Various halogen-free polymers have also been employed, such as polyolefins. Due to their relatively low melting point, however, polyolefins still do not provide sufficient thermal protection. Furthermore, it is often necessary to employ a bromine-based flame retardant in polyolefin conduits to help improve resistivity to fire. Once again, the presence of a substantial amount of bromine in the conduit can still lead to the production of toxins at high temperatures.

As such, a need currently exists for a thermoplastic composition that is generally fire-resisting and also has a relatively high melting point so that it can be employed in an electrical conduit.

SUMMARY OF THE INVENTION

In accordance with one embodiment of the present invention, an electrical conduit is disclosed that comprises a jacket that defines a hollow passageway. At least a portion of the jacket is formed from a thermoplastic composition that comprises a polyarylene sulfide and a fire-resisting system. The fire-resisting system comprises an organophosphorous flame retardant. The thermoplastic composition also has a melting temperature of from about 200° C. to about 500° C.

In accordance with another embodiment of the present invention, an electrical conduit is disclosed that comprises a jacket that defines a hollow passageway. At least a portion of the jacket is formed from a thermoplastic composition that comprises polyphenylene sulfide and a fire-resisting system. The fire-resisting system comprises a halogen-free polyphosphate flame retardant and an inorganic molybdate or inorganic borate. The thermoplastic composition has a melting temperature of from about 200° C. to about 500° C.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
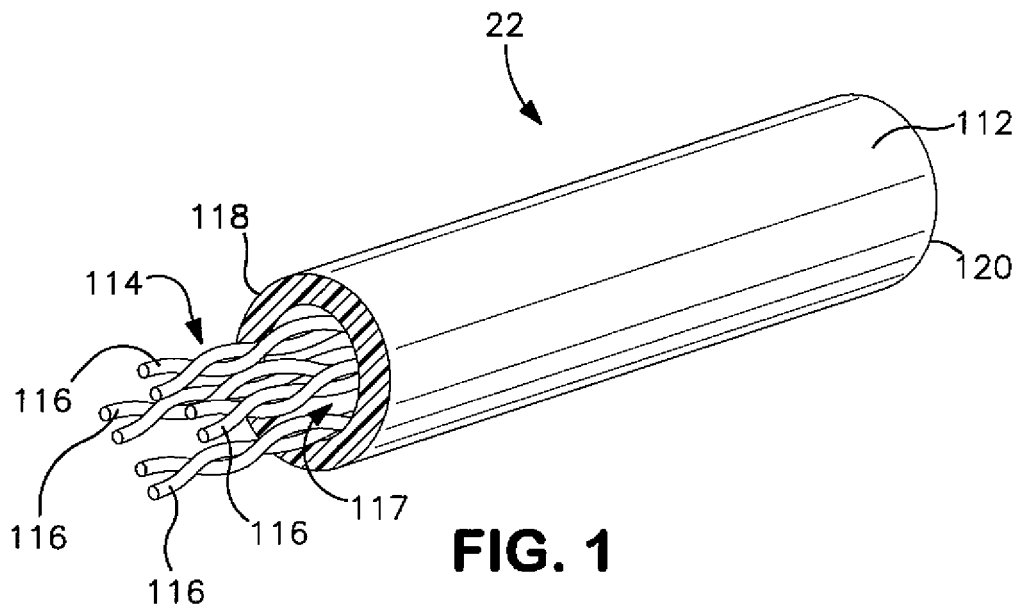
FIG. 1 is a perspective view of one embodiment of an electrical conduit that may be formed in accordance with the present invention.

It is to be understood by one of ordinary skill in the art that the present discussion is a description of exemplary embodiments only, and is not intended as limiting the broader aspects of the present invention.

Generally speaking, the present invention is directed to an electrical conduit that contains a jacket that defines a hollow passageway. At least a portion of the jacket is formed from a thermoplastic composition that contains a polyarylene sulfide and fire-resisting system. Due in part to the specific nature and concentration of these components, the present inventors have discovered that the resulting thermoplastic composition may have a relatively high melting temperature, such as from about 200° C. to about 500° C., in some embodiments from about 225° C. to about 400° C., and in some embodiments, from about 250° C. to about 350° C. The high melting temperature can allow the conduit to be employed in various high temperature applications.

Various embodiments of the thermoplastic composition and the resulting conduit will now be described in more detail.

I. Thermoplastic Composition

A. Polyarylene Sulfide

To help achieve the properties noted above, the thermoplastic composition may comprise at least one polyarylene sulfide that is able to withstand relatively high temperatures without melting. Although the actual amount may vary depending on desired application, polyarylene sulfide(s) typically constitute from about 30% by weight to about 90% by weight, in some embodiments from about 40% by weight to about 85% by weight, and in some embodiments, from about 50% by weight to about 80% by weight of the thermoplastic composition. The polyarylene sulfide(s) generally have repeating units of the formula:

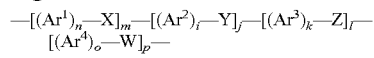

[(Ar⁴)ₒ—W]ₚ— wherein, $Ar^1$, $Ar^2$, $Ar^3$, and $Ar^4$ are independently arylene units of 6 to 18 carbon atoms;

W, X, Y, and Z are independently bivalent linking groups selected from —$SO_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —($C_6H_4$—S)ₙ— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalodiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

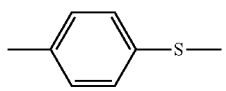

and segments having the structure of formula:

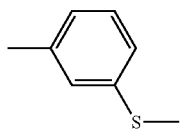

or segments having the structure of formula:

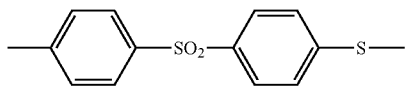

The polyarylene sulfide(s) may also be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Regardless of the particular structure, the number average molecular weight of the polyarylene sulfide is typically about 15,000 g/mol or more, and in some embodiments, about 30,000 g/mol or more. In certain cases, a small amount of chlorine may be employed during formation of the polyarylene sulfide. Nevertheless, the polyarylene sulfide may still have a low chlorine content, such as about 1000 ppm or less, in some embodiments about 900 ppm or less, in some embodiments from about 1 to about 800 ppm, and in some embodiments, from about 2 to about 700 ppm. In certain embodiments, however, the polyarylene sulfide is generally free of chlorine or other halogens.

B. Fire-Resisting System

In addition to a polyarylene sulfide, the thermoplastic composition also comprises a fire-resisting system that is capable of achieving the desired flammability performance, smoke suppression, and mechanical properties without the use of conventional halogen-based flame retardants. Consequently, the fire-resisting system includes at least one low halogen fire-resisting agent, such as flame retardants, char-forming agents, smoke suppressants, etc., as well as mixtures of the foregoing. The halogen (e.g., bromine, chlorine, and/or fluorine) content of such an agent is about 500 parts per million by weight ("ppm") or less, in some embodiments about 100 ppm or less, and in some embodiments, about 50 ppm or less. In certain embodiments, the fire-resisting agents are free of halogens (i.e., "halogen free").

One example of a suitable low halogen flame retardant is, for instance, an organophosphorous compound, such as a salt of phosphinic acid and/or diphosphinic acid (i.e., "phosphinate") having the general formula (I) and/or formula (II):

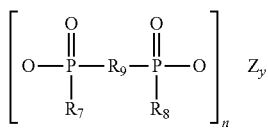

wherein, $R_7$ and $R_8$ are, independently, hydrogen or substituted or unsubstituted, straight chain, branched, or cyclic hydrocarbon groups (e.g., alkyl, alkenyl, alkylnyl, aralkyl, aryl, alkaryl, etc.) having 1 to 6 carbon atoms, particularly alkyl groups having 1 to 4 carbon atoms, such as methyl, ethyl, n-propyl, iso-propyl, n-butyl, or tert-butyl groups;

$R_9$ is a substituted or unsubstituted, straight chain, branched, or cyclic $C_1$-$C_{10}$ alkylene, arylene, arylalkylene, or alkylarylene group, such as a methylene, ethylene, n-propylene, iso-propylene, n-butylene, tert-butylene, n-pentylene, n-octylene, n-dodecylene, phenylene, naphthylene, methyiphenylene, ethylphenylene, tert-butylphenylene, methylnaphthylene, ethylnaphthylene, t-butylnaphthylene, phenylethylene, phenylpropylene or phenylbutylene group;

Z is a metal (e.g., magnesium, calcium, aluminum, antimony, tin, germanium, titanium, iron, zirconium, cesium, bismuth, strontium, manganese, lithium, sodium, potassium, etc.) or protonated nitrogen base;

m is from 1 to 4, in some embodiments from 1 to 3, and in some embodiments, from 2 to 3 (e.g., 3);

n is from 1 to 4, in some embodiments from 1 to 3, and in some embodiments, from 2 to 3 (e.g., 3);

p is from 1 to 4, in some embodiments from 1 to 3, and in some embodiments, from 1 to 2; and y is from 1 to 4, in some embodiments from 1 to 3, and in some embodiments, from 1 to 2.

The phosphinates may, for instance, be prepared using any known technique, such as by reacting a phosphinic acid with metal carbonates, metal hydroxides or metal oxides in aqueous solution. Suitable phosphinates include, for example, salts (e.g., aluminum or calcium salt) of dimethyiphosphinic acid, ethylmethyiphosphinic acid, diethylphosphinic acid, methyl-n-propylphosphinic acid, methane-di(methylphosphinic acid), ethane-1,2-di(methylphosphinic acid), hexane-1,6-di(methylphosphinic acid), benzene-1,4-di(methylphosphinic acid), methylphenylphosphinic acid, diphenylphosphinic acid, hypophosphoric acid, etc. The resulting salts are typically monomeric compounds; however, polymeric phosphinates may also be formed. Additional examples of suitable phosphinic compounds and their methods of preparation are described in U.S. Pat. No. 7,087,666 to Hoerold, et al.; U.S. Pat. No. 6,716,899 to Klatt, et al.; U.S. Pat. No. 6,270,500 to Kleiner, et al.; U.S. Pat. No. 6,194,605 to Kleiner; U.S. Pat. No. 6,096,914 to Seitz; and U.S. Pat. No. 6,013,707 to Kleiner, et al. One particularly suitable phosphinate is an aluminum salt of diethylphosphinic acid, such as commercially available from Clariant under the name EXOLIT® (e.g., EXOLIT® OP 935, OP 930, OP 1230).

Another suitable low halogen organophosphorous flame retardant may be a polyphosphate having the following general formula:

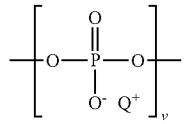

v is from 1 to 1000, in some embodiments from 2 to 500, in some embodiments from 3 to 100, and in some embodiments, from 5 to 50; and Q is a nitrogen base. Suitable nitrogen bases may include those having a substituted or unsubstituted ring structure, along with at least one nitrogen heteroatom in the ring structure (e.g., heterocyclic or heteroaryl group) and/or at least one nitrogen-containing functional group (e.g., amino, acylamino, etc.) substituted at a carbon atom and/or a heteroatom of the ring structure. Examples of such heterocyclic groups may include, for instance, pyrrolidine, imidazoline, pyrazolidine, oxazolidine, isoxazolidine, thiazolidine, isothiazolidine, piperidine, piperazine, thiomorpholine, etc. Likewise, examples of heteroaryl groups may include, for instance, pyrrole, imidazole, pyrazole, oxazole, isoxazole, thiazole, isothiazole, triazole, furazan, oxadiazole, tetrazole, pyridine, diazine, oxazine, triazine, tetrazine, and so forth. If desired, the ring structure of the base may also be substituted with one or more functional groups, such as acyl, acyloxy, acylamino, alkoxy, alkenyl, alkyl, amino, aryl, aryloxy, carboxyl, carboxyl ester, cycloalkyl, hydroxyl, halo, haloalkyl, heteroaryl, heterocyclyl, etc. Substitution may occur at a heteroatom and/or a carbon atom of the ring structure. For instance, one suitable nitrogen base may be a triazine in which one or more of the carbon atoms in the ring structure are substituted by an amino group. One particularly suitable base is melamine, which contains three carbon atoms in the ring structure substituted with an amino functional group. Such bases may form a melamine polyphosphate, such as those commercially available from BASF under the name MELAPUR® (e.g., MELAPUR® 200 or 200/70).

In certain embodiments of the present invention, the fire-resisting system may be formed entirely of one or more organophosphorous compounds, such as those described above. In certain embodiments, however, it may be desired to employ additional compounds to help increase the effectiveness of the system. Yet, even in such embodiments, organophosphorous compounds typically constitute about 40% by weight or more, in some embodiments from about 50% by weight to about 90% by weight, and in some embodiments, from about 55% by weight to 85% by weight of the fire-resisting system. Further, in such embodiments, organophosphorous compounds may likewise constitute from about 1% by weight to about 40% by weight, in some embodiments from about 2% by weight to about 30% by weight, and in some embodiments, from about 5% by weight to about 25% by weight of the thermoplastic composition.

In some embodiments of the present invention, inorganic compounds may be employed as low halogen char-forming agents and/or smoke suppressants in combination with an organophosphorous compound. Suitable inorganic compounds (anhydrous or hydrates) may include, for instance, inorganic molybdates, such as zinc molybdate (e.g., commercially available under the designation Kemgard® from Huber Engineered Materials), calcium molybdate, ammonium octamolybdate, zinc molybdate-magnesium silicate, etc. Other suitable inorganic compounds may include inorganic borates, such as zinc borate (commercially available under the designation Firebrake® from Rio Tinto Minerals), etc.); zinc phosphate, zinc hydrogen phosphate, zinc pyrophosphate, basic zinc chromate (VI) (zinc yellow), zinc chromite, zinc permanganate, silica, magnesium silicate, calcium silicate, calcium carbonate, titanium dioxide, magnesium dihydroxide, and so forth. When employed, the weight ratio of the organophosphorous compound(s) to inorganic compounds (e.g., inorganic molybdates) may be selectively controlled to achieve a suitable balance between flame retardancy and mechanical properties. For example, the ratio may be within the range of from about 0.1 to about 10, in some embodiments from about 0.5 to about 6, and in some embodiments, from about 1 to about 4. Inorganic compounds (e.g., inorganic molybdates) may, for example, constitute about 60% by weight or less, in some embodiments from about 10% by weight to about 50% by weight, and in some embodiments, from 15% by weight to about 45% by weight of the fire-resisting system. The inorganic compounds (e.g., inorganic molybdates) may also constitute from about 0.5% by weight to about 25% by weight, in some embodiments from about 1% by weight to about 20% by weight, and in some embodiments, from about 3% by weight to about 15% by weight of the thermoplastic composition.

If desired, other additives may also be employed in the fire-resisting system of the present invention. For instance, nitrogen-containing synergists may be employed that act in conjunction with the organophosphorous compound(s) to result in a more effective fire-resisting system. Such nitrogen-containing synergists may include those of the formulae (III) to (VIII), or a mixture of thereof:

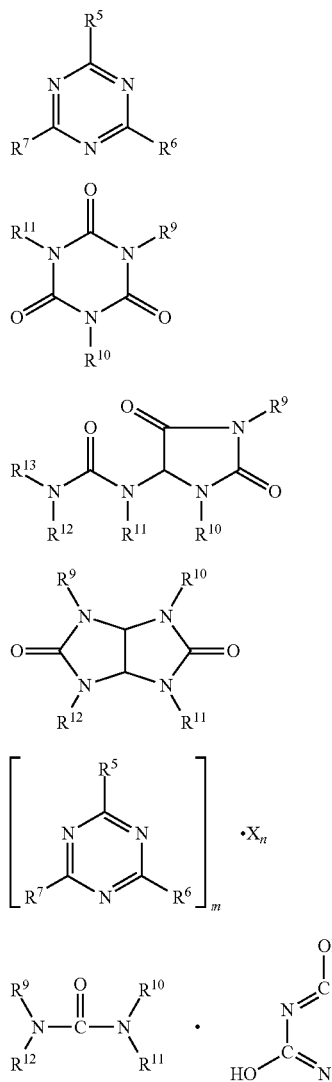

wherein, $R_5$, $R_6$, $R_7$, $R_9$, $R_{10}$, $R_{11}$, $R_{12}$, and $R_{13}$ are, independently, hydrogen; $C_1$-$C_8$ alkyl; $C_5$-$C_{16}$-cycloalkyl or alkylcycloalkyl, optionally substituted with a hydroxy or a $C_1$-$C_4$ hydroxy-alkyl; $C_2$-$C_8$ alkenyl; $C_1$-$C_8$ alkoxy, acyl, or acyloxy; $C_6$-$C_{12}$-aryl or arylalkyl; $OR^8$ or $N(R^8)R^9$, wherein $R^8$ is hydrogen, $C_1$-$C_8$ alkyl, $C_5$-$C_{16}$ cycloalkyl or alkylcycloalkyl, optionally substituted with a hydroxy or a $C_1$-$C_4$ hydroxyalkyl, $C_2$-$C_8$ alkenyl, $C_1$-$C_8$ alkoxy, acyl, or acyloxy, or $C_6$-$C_{12}$ aryl or arylalkyl;

m is from 1 to 4;

n is from 1 to 4;

X is an acid that can form adducts with triazine compounds of the formula III. For example, the nitrogen-containing synergist may include benzoguanamine, tris(hydroxyethyl) isocyanurate, allantoin, glycoluril, melamine, melamine cyanurate, dicyandiamide, guanidine, etc. Examples of such synergists are described in U.S. Pat. Nos. 6,365,071 to Jenewein, et al.; 7,255,814 to Hoerold, et al.; and 7,259,200 to Bauer, et al. One particularly suitable synergist is melamine cyanurate, such as commercially available from BASF under the name MELAPUR® MC (e.g., MELAPUR® MC 15, MC25, MC50).

The weight ratio of the organophosphorous compound(s) to the optional nitrogen-containing synergist(s) may be within a range of from about 0.1 to about 10, in some embodiments from about 0.5 to about 6, and in some embodiments, from about 1 to about 4. Nitrogen-containing synergists may, for example, constitute about 50% by weight or less, in some embodiments about 40% by weight or less, and in some embodiments, from 0% by weight to about 20% by weight of the fire-resisting system. The optional synergists may likewise constitute from about 0.5% by weight to about 20% by weight, in some embodiments from about 1% by weight to about 15% by weight, and in some embodiments, from about 1% by weight to about 10% by weight of the thermoplastic composition.

Although not necessarily required, the fire-resisting system and/or the composition itself may also have a relatively low content of halogens (i.e., bromine, fluorine, and/or chlorine), such as about 15,000 parts per million ("ppm") or less, in some embodiments about 5,000 ppm or less, in some embodiments about 1,000 ppm or less, in some embodiments from about 1 ppm to about 800 ppm, and in some embodiments, from about 2 ppm to about 600 ppm. Nevertheless, in certain embodiments of the present invention, halogen-based fire-resisting agents may still be employed. Particularly suitable halogen-based fire-resisting agents are fluoropolymers, such as polytetrafluoroethylene (PTFE), fluorinated ethylene polypropylene (FEP) copolymers, perfluoroalkoxy (PFA) resins, polychlorotrifluoroethylene (PCTFE) copolymers, ethylene-chlorotrifluoroethylene (ECTFE) copolymers, ethylene-tetrafluoroethylene (ETFE) copolymers, polyvinylidene fluoride (PVDF), polyvinylfluoride (PVF), and copolymers and blends and other combination thereof. When employed, such halogen-based fire-resisting agents typically constitute only about 40 wt. % or less, in some embodiments about 30 wt. % or less, and in some embodiments, from about 1 to about 30 wt. % of the fire-resisting composition. Likewise, the halogen-based fire-resisting agents typically constitute about 20 wt. % or less, in some embodiments about 15 wt. % or less, and in some embodiments, from about 1 wt. % to about 10 wt. % of the thermoplastic composition.

Regardless of the particular components employed, the fire-resisting system typically constitutes from about 1% by weight to about 40% by weight, in some embodiments from about 2% by weight to about 30% by weight, and in some embodiments, from about 4% by weight to about 25% by weight of the thermoplastic composition.

C. Other Additives

In addition to the polyarylene sulfide and fire-resisting system, the thermoplastic composition may also contain a variety of other additives to enhance its processability and/or properties. In one embodiment, for example, at least one impact modifier may be employed in the composition to help improve its mechanical properties. Examples of suitable impact modifiers may include, for instance, polyepoxides, polyurethanes, polybutadiene, acrylonitrile-butadiene-styrene, polysiloxanes etc., as well as mixtures thereof. In one particular embodiment, a polyepoxide modifier is employed that contains at least two oxirane rings per molecule. The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. The term "(meth)acrylic" includes acrylic and methacrylic monomers, as well as salts or esters thereof, such as acrylate and methacrylate monomers. Suitable epoxy-functional (meth) acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

If desired, additional monomers may also be employed in the polyepoxide to help achieve the desired melt viscosity. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene. In one particularly desirable embodiment of the present invention, the polyepoxide modifier is a copolymer formed from an epoxy-functional (meth)acrylic monomeric component and α-olefin monomeric component. For example, the polyepoxide modifier may be poly(ethylene-co-glycidyl methacrylate). One specific example of a suitable polyepoxide modifier that may be used in the present invention is commercially available from Arkema under the name Lotader® AX8840. Lotader® AX8840 has a melt flow rate of 5 g/10 min and has a glycidyl methacrylate monomer content of 8% by weight.

Still another suitable additive that may be employed to improve the mechanical properties of the thermoplastic composition is an organosilane coupling agent. The coupling agent may, for example, be any alkoxysilane coupling agent as is known in the art, such as vinlyalkoxysilanes, epoxyalkoxysilanes, aminoalkoxysilanes, mercaptoalkoxysilanes, and combinations thereof. Aminoalkoxysilane compounds typically have the formula: $R^5$—Si—$(R^6)_3$, wherein $R^5$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^6$ is an alkoxy group of from about 1 to about 10 atoms, or from about 2 to about 5 carbon atoms, such as methoxy, ethoxy, propoxy, and so forth. In one embodiment, $R^5$ is selected from the group consisting of aminomethyl, aminoethyl, aminopropyl, ethylene, ethyne, propylene and propyne, and $R^6$ is selected from the group consisting of methoxy groups, ethoxy groups, and propoxy groups. In another embodiment, $R^5$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne and so forth, and $R^6$ is an alkoxy group of from about 1 to about 10 atoms, such as methoxy group, ethoxy group, propoxy group, and so forth. A combination of various aminosilanes may also be included in the mixture.

Some representative examples of aminosilane coupling agents that may be included in the mixture include aminopropyl triethoxysilane, aminoethyl triethoxysilane, aminopropyl trimethoxysilane, aminoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl) tetramethoxysilane, bis(3-aminopropyl) tetraethoxy disiloxane, and combinations thereof. The amino silane may also be an aminoalkoxysilane, such as γ-aminopropyltrimethoxysilane, γ-aminopropyltriethoxysilane, γ-aminopropylmethyltrimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

Fillers may also be employed in the thermoplastic composition to help achieve the desired physical properties and/or color. When employed, such mineral fillers typically constitute from about 5% by weight to about 40% by weight, in some embodiments from about 10% by weight to about 35% by weight, and in some embodiments, from about 10% by weight to about 30% by weight of the thermoplastic composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite ((K, $H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite ((Mg, $Al)_2Si_4O_{10}(OH) \cdot 4(H_2O)$), pyrophyllite ($Al_2Si_4O_{10}(O_{10}(OH)_2$), etc., as well as combinations thereof. In lieu of, or in addition to, clay minerals, still other mineral fillers may also be employed. For example, other suitable mineral fillers may also be employed, such as calcium silicate, aluminum silicate, mica, titanium dioxide, diatomaceous earth, wollastonite, calcium carbonate, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($K,Na)(Al,Mg,Fe)_2(Si,Al)_4O_{10}(OH)_2$), etc., as well as combinations thereof.

Fibrous fillers may also be employed in the thermoplastic composition. When employed, such fibrous fillers typically constitute from about 5% by weight to about 40% by weight, in some embodiments from about 10% by weight to about 35% by weight, and in some embodiments, from about 10% by weight to about 30% by weight of the thermoplastic composition. The fibrous fillers may include one or more fiber types including, without limitation, polymer fibers, glass fibers, carbon fibers, metal fibers, and so forth, or a combination of fiber types. In one embodiment, the fibers may be chopped glass fibers or glass fiber rovings (tows). Fiber diameters can vary depending upon the particular fiber used and are available in either chopped or continuous form. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

Lubricants may also be employed in the thermoplastic composition that are capable of withstanding the processing conditions of poly(arylene sulfide) (typically from about 290° C. to about 320° C.) without substantial decomposition. Exemplary of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05% by weight to about 1.5% by weight, and in some embodiments, from about 0.1% by weight to about 0.5% by weight of the thermoplastic composition.

Still other additives that can be included in the composition may include, for instance, antimicrobials, pigments, antioxidants, stabilizers, surfactants, waxes, flow promoters, solid solvents, and other materials added to enhance properties and processability.

The materials used to form the thermoplastic composition may be combined together using any of a variety of different techniques as is known in the art. In one particular embodiment, for example, the polyarylene sulfide, fire-resisting system, and other optional additives are melt processed as a mixture within an extruder to form the thermoplastic composition. The mixture may be melt-kneaded in a single-screw or multi-screw extruder at a temperature of from about 250° C. to about 320° C. In one embodiment, the mixture may be melt processed in an extruder that includes multiple temperature zones. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components (e.g., polyarylene sulfide, fire-resisting system, and other optional additives) may be fed to the feed throat in the first barrel by means of a volumetric feeder. In another embodiment, different components may be added at different addition points in the extruder, as is known. For example, the polyarylene sulfide and other optional additives may be applied at the feed throat, and the fire-resisting system may be supplied at a temperature zone located downstream therefrom. Likewise, when the fire-resisting system contains different components, those components may also be supplied at the same or different location along the extruder. Regardless, the resulting mixture can be melted and mixed then extruded through a die. The extruded thermoplastic composition can then be quenched in a water bath to solidify and granulated in a pelletizer followed by drying. The melt viscosity of the extruded composition may be about 8 kilopoise or less, in some embodiments from about 0.5 to about 6 kilopoise, and in some embodiments, from about 3 to about 5 kilopoise, as determined in accordance with ISO Test No. 11443 at a shear rate of about 1200 $s^{-1}$ and at a temperature of 316° C.

As a result of the present invention, a thermoplastic composition may be formed that has a relatively high melting point and a relatively low melting point, as discussed above. Furthermore, the composition is generally flame retardant, which may be quantified in a variety of different ways. For example, the degree to which the composition can extinguish a fire ("char formation") may be represented by its Limiting Oxygen Index ("LOI"), which is the volume percentage of oxygen needed to support combustion. More particularly, the LOI of the thermoplastic composition may be about 35 or more, in some embodiments about 40 or more, and in some embodiments, from about 50 to 100, as determined in accordance with ASTM D2863-10. Another parameter that represents the flammability of a composition is the peak rate of heat release, which generally expresses the maximum intensity of a fire. The thermoplastic composition may, for example, exhibit a peak heat release rate of about 200 $kW/m^2$ or less, in some embodiments from about 10 to about 180 $kW/m^2$, and in some embodiments, from about 20 to about 150 $kW/m^2$, as measured by a cone calorimeter in accordance with ASTM E1354-11b. Another property that represents the flammability of the composition is the maximum average rate of heat emission, which expresses the sustained heat supplied by combustion of the composition. The thermoplastic composition of the present invention may, for example, exhibit a maximum average rate of heat emission of about 150 $kW/m^2$ or less, in some embodiments from about 10 to about 100 $kW/m^2$, in some embodiments, from about 20 to about 80 $kW/m^2$, as measured by a cone calorimeter in accordance with ASTM E1354-11b.

In addition to possessing flame retardant properties, the thermoplastic composition may also exhibit a relatively low degree of smoke production. For example, the thermoplastic composition may exhibit a maximum smoke density ("$D_s$") that is about 250 or less, in some embodiments about 200 or less, and in some embodiments, from about 5 to about 150, as determined at an exposure period of 4 minutes in accordance with the smoke density test as set forth in ASTM E662-09. The composition may also exhibit an average specific extinction area (smoke production) of about 0.800 m²/g or less, in some about 0.500 m²/g or less, and in some embodiments, from about 0.050 to about 0.450 m²/g, as measured by a cone calorimeter in accordance with ASTM E1354-11 b.

II. Electrical Conduit

The electrical conduit of the present invention generally includes a jacket that defines a hollow passageway for receiving at least one cable. The term "cable" may refer to a single insulated conductor, or a group of conductors insulated from each other and forming a stranded assembly that may be further insulated by outside wrappings, such as, for example, metal wire (e.g., copper wire), telephone line, fiber optic cable, telecommunications cable, electrical transmission/distribution lines, lines for promoting support of elevated structures (e.g., guide wires), etc. Signals carried by a cable may include electrical and/or optical signals.

Referring to FIG. 1, one particular embodiment of an electrical conduit 22 is shown. The conduit 22 includes a jacket 112 that has a first end portion 118 and a second end portion 120 opposing the first end portion 118. The jacket 112 may contain one or more multiple layers, one or more of which may be formed by the thermoplastic composition of the present invention. In FIG. 1, for instance, the jacket 112 is constructed of a single layer. The jacket 112 also defines a hollow passageway 117 for receiving at least one cable therethrough. For example, in the illustrated embodiment, the conduit 112 receives a core 114 formed by a plurality of individually insulated cables 116 (e.g., copper wire). In one particular embodiment, the thermoplastic composition of the present invention may be used to form the jacket 112. The passageway 117 has a cross-sectional dimension that is substantially circular. Of course, any of a variety of other shapes may also be employed. For example, the passageway 117 may have a polygonal (e.g., square or rectangular) cross-sectional shape. The size of the passageway 117 may also vary, such as from about 0.5 to about 2 inches.

Figure 2:
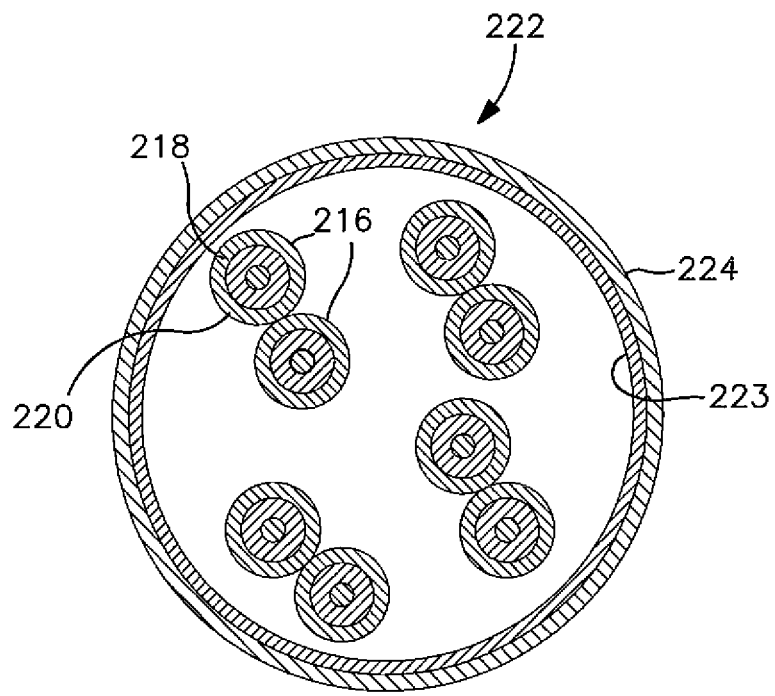
FIG. 2 is a cross-sectional view of another embodiment of an electrical conduit that may be formed in accordance with the present invention.

In the embodiment shown in FIG. 1, the jacket 112 is constructed of a single layer. Alternatively, the jacket may be constructed of multiple layers. In FIG. 2, for instance, an electrical conduit 222 is shown that contains a jacket formed from an outer layer 224 and an inner layer 223. In certain embodiments, the outer layer 224 is formed from the thermoplastic composition of the present invention, while the inner layer 223 is formed from a metallic shield material. Regardless, the jacket may also enclose at least one cable. In the illustrated embodiment, for instance, the elongation member encloses cables 216 that contain a conductive core 218 surrounded by insulation layers 218 and 220.

Test Methods

Limiting Oxygen Index: The Limiting Oxygen Index ("LOI") may be determined by ASTM D2863-10, which may be technically equivalent to ISO 4589-1,2. LOI is the minimum concentration of oxygen that will just support flaming combustion in a flowing mixture of oxygen and nitrogen. More particularly, a specimen may be positioned vertically in a transparent test column and a mixture of oxygen and nitrogen may be forced upward through the column. The specimen may be ignited at the top. The oxygen concentration may be adjusted until the specimen just supports combustion. The concentration reported is the volume percent of oxygen at which the specimen just supports combustion.

Peak Heat Release Rate: This value represents the peak heat release rate (kW/m²) as determined in accordance with ASTM E1354-11b.

Maximum Average Rate of Heat Emission: This value represents the maximum average rate of heat emission (kW/m²) as determined in accordance with ASTM E1354-11b.

Average Specific Extinction Area: This value represents the average area of smoke (m²/kg) generated during a flammability test conducted in accordance with ASTM E1354-11b.

Melt Viscosity: The melt viscosity may be reported as scanning shear rate viscosity as determined in accordance with ISO Test No. 11443 (technically equivalent to ASTM D3835) at a shear rate of about 1200 s$^{-1}$ and at a temperature of 316° C. using a Dynisco 7001 capillary rheometer. The rheometer orifice (die) may have a diameter of 1 mm, a length of 20 mm, an L/D ratio of 20.1, and an entrance angle of 180°. The diameter of the barrel may be 9.55 mm±0.005 mm and the length of the rod may be 233.4 mm.

Tensile Modulus, Tensile Stress (at break and yield points), and Tensile Strain (at break and yield points): Tensile properties may be tested according to ISO Test No. 527 (technically equivalent to ASTM D638). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress (at 3.5% strain): Flexural properties can be tested according to ISO Test No. 178 (technically equivalent to ASTM D790). This test can be performed on a 64 mm support span. Tests can be run on the center portions of uncut ISO 3167 multi-purpose bars. The testing temperature may be 23° C. and the testing speed may be 2 mm/min.

Chlorine Content: Chlorine content can be determined according to an elemental analysis using Parr Bomb combustion followed by Ion Chromatography.

The present invention may be better understood with reference to the following examples.

EXAMPLE 1

The ability to form a flame thermoplastic composition is demonstrated. More particularly, the components listed in the table below are mixed in a Werner Pfleiderer ZSK 25 co-rotating intermeshing twin-screw extruder having a 25 mm diameter and eight (8) different heated mixing zones (feed throat and Zones 1-7).

| Components (% by weight) | Sample 1 | Sample 2 | Sample 3 | Sample 4 | Sample 5 | Sample 6 | Sample 7 | Sample 8 | Sample 9 |
|---|---|---|---|---|---|---|---|---|---|
| Fortron ® 0214 B1 (PPS) | 79.45 | 75.46 | 63.47 | 75.46 | 63.47 | 75.46 | 63.47 | 59.45 | 59.45 |
| Glycolube ® P | 0.3 | 0.3 | 0.3 | 0.3 | 0.3 | 0.3 | 0.3 | 0.3 | 0.3 |
| Lotader ® AX8840 | 20 | 18.99 | 15.98 | 18.99 | 15.98 | 18.99 | 15.98 | 10 | 15 |

| Components (% by weight) | Sample 1 | Sample 2 | Sample 3 | Sample 4 | Sample 5 | Sample 6 | Sample 7 | Sample 8 | Sample 9 |
|---|---|---|---|---|---|---|---|---|---|
| Shin-ETSU KBE-903 Aminosilane | 0.25 | 0.25 | 0.25 | 0.25 | 0.25 | 0.25 | 0.25 | 0.25 | 0.25 |
| Melapur ® 200 | — | — | — | 5 | 20 | — | — | 30 | 15 |
| Melapur ® MC 15 | — | 5 | 20 | — | — | 1.67 | 6.67 | — | — |
| Exolit ® OP 935 | — | — | — | — | — | 3.33 | 13.3 | — | — |
| Kemgard 911B | — | — | — | — | — | — | — | — | 5 |
| Firebrake 500 | — | — | — | — | — | — | — | — | 5 |

The fire-resisting system is supplied to a heated mixing zone, while the polymer and remaining materials are supplied at the feed throat. Once compounded, parts are then molded from each sample on a Mannesmann Demag D100 NCIII injection molding machine and tested. The results are set forth below.

| Properties | Sample 1 | Sample 2 | Sample 3 | Sample 4 | Sample 5 | Sample 6 | Sample 7 | Sample 8 | Sample 9 |
|---|---|---|---|---|---|---|---|---|---|
| Melting Temp. (° C.) | 278.6 | 279.2 | 279.6 | 278.5 | 278.2 | 279.4 | 279 | 279 | 281 |
| Halogen Content (ppm)[1] | 516 | 490 | 412 | 490 | 412 | 490 | 412 | 380 | 380 |
| Melt Viscosity (316° C., 1200 $s^{-1}$) (poise) | 3300 | 3393 | 5034 | 3863 | 5414 | 4598 | 4310 | 1295 | 2719 |
| Limiting Oxygen Index ("LOI") | 44.2 | 44.2 | 42 | 50.1 | 53.3 | 44.2 | 49.8 | 57.9 | 49.5 |
| Tensile Modulus (MPa) | 1936 | 1955 | 2008 | 2042 | 2331 | 1982 | 2448 | 3207 | 2553 |
| Tensile Stress at Yield (MPa) | 44.29 | 42.96 | 37.9 | 41.91 | 37.87 | 42.31 | 38.1 | — | — |
| Tensile Strain at Yield (%) | 14.54 | 14.47 | 14.96 | 5.39 | 5.21 | 17.61 | 5.72 | — | — |
| Tensile Stress at Break (MPa) | 43.65 | 42.49 | 37.43 | 40.74 | 37.54 | 40.54 | 37.1 | 47.46 | 44.51 |
| Tensile Strain at Break (%) | 35.95 | 17.11 | 16.94 | 6.85 | 4.71 | 20.77 | 9.6 | 2.54 | 3.66 |
| Flexural Modulus (MPa) | 2320 | 2210 | 2427 | 2186 | 2633 | 2267 | 2700 | 3252 | 2725 |
| Flexural Stress at 3.5% Strain (MPa) | 61.06 | 56.21 | 56.65 | 57.79 | 63.71 | 58.43 | 64.1 | 83.64 | 70.36 |
| Peak Heat Release Rate (kW/$m^2$) | 200.7 | — | — | — | 121.15 | — | 137 | 134 | 139 |
| Maximum Average Rate of Heat Emission | 123.69 | — | — | — | 85.47 | — | 82 | 55 | 83 |
| Specific Extinction Area ($m^2$/g) | 0.522 | — | — | — | 0.435 | — | 0.38 | 0.433 | 0.571 |

[1] The Fortron ® PPS 0214 B1 resin used herein has a chlorine content of 649 ppm. The halogen content of the thermoplastic composition is thus calculated on the basis that no other halogens are present.

As indicated above, the samples of the present invention have a high melting temperature and a high LOI value, as well as a low peak heat release rate and low specific extinction area, all of which are accomplished without sacrificing mechanical properties.

EXAMPLE 2

The ability to form a flame thermoplastic composition is demonstrated. More particularly, the components listed in the table below are mixed in a Werner Pfleiderer ZSK 25 co-rotating intermeshing twin-screw extruder having a 25 mm diameter and eight (8) different heated mixing zones (feed throat and Zones 1-7).

| Components (% by weight) | Sample 10 |
|---|---|
| Fortron ® 0205 B4 (PPS) | 59.45 |
| Glycolube ® P | 0.3 |
| Lotader ® AX8840 | 15 |
| Shin-ETSU KBE-903 (Aminosilane) | 0.25 |
| Melapur ® 200 | 5 |
| Kemgard ™ 911B (Zinc Molybdate) | 5 |
| Fluon ™ FL1690 (PTFE) | 15 |

The fire-resisting system is supplied to a heated mixing zone, while the polymer and remaining materials are supplied at the feed throat. Once compounded, parts are then molded from each sample on a Mannesmann Demag D100 NCIII injection molding machine and tested. The results are set forth below.

| Properties | Sample 10 |
|---|---|
| Melting Temp. (° C.) | 281 |
| Melt Viscosity (316° C., 1200 s$^{-1}$) (poise) | 280 |
| Limiting Oxygen Index ("LOI") | 43.6 |
| Tensile Modulus (MPa) | 1946 |
| Tensile Stress at Break (MPa) | 38 |
| Tensile Strain at Break (%) | 7.76 |
| Flexural Modulus (MPa) | 1986 |
| Flexural Stress at 3.5% Strain (MPa) | 55.4 |
| Peak Heat Release Rate (kW/m$^2$) | 83 |
| Maximum Average Rate of Heat Emission | 58 |
| Specific Extinction Area (m$^2$/g) | 0.11 |

PROPHETIC EXAMPLE

The components listed in the table below may be mixed in a Werner Pfleiderer ZSK 25 co-rotating intermeshing twin-screw extruder having a 25 mm diameter and eight (8) different heated mixing zones (feed throat and Zones 1-7).

| Components (% by weight) | Sample 11 |
|---|---|
| Fortron ® 0205 B4 (PPS) | 54.55 |
| Glycolube ® P | 0.3 |
| Lotader ® AX8840 | 15 |
| Shin-ETSU KBE-903 (Aminosilane) | 0.25 |
| Melapur ® 200 | 5 |
| Kemgard ™ 911B (Zinc Molybdate) | 5 |
| Fluon ™ FL1690 (PTFE) | 15 |
| Vicron ™ 15-15 (CaCO$_3$) | 5 |

The fire-resisting system may be supplied to a heated mixing zone, while the polymer and remaining materials may be supplied at the feed throat.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrical conduit comprising a jacket that defines a hollow passageway, wherein at least a portion of the jacket is formed from a thermoplastic composition that comprises a polyarylene sulfide and a fire-resisting system, the fire-resisting system comprising an organophosphorous flame retardant, and wherein the thermoplastic composition has a melting temperature of from about 200° C. to about 500° C., wherein the thermoplastic composition exhibits a peak heat release rate of 200 kW/m$^2$ or less, as determined in accordance with ASTM E1354-11b.

2. The electrical conduit of claim 1, wherein polyarylene sulfides constitute from about 30% by weight to about 90% by weight of the composition, and wherein the fire-resisting system constitutes from about 1% by weight to about 40% by weight of the composition.

3. The electrical conduit of claim 1, wherein the organophosphorous flame retardant is a phosphinate having the general formula (I) and/or formula (II):

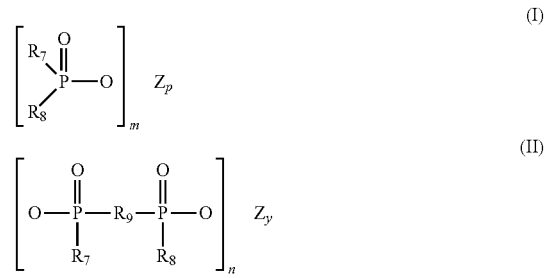

wherein,
R$_7$ and R$_8$ are, independently, hydrogen or substituted or unsubstituted, straight chain, branched, or cyclic hydrocarbon groups having 1 to 6 carbon atoms;
R$_9$ is a substituted or unsubstituted, straight chain, branched, or cyclic C$_1$-C$_{10}$ alkylene, arylene, arylalkylene, or alkylarylene group;
Z is a metal or protonated nitrogen base;
m is from 1 to 4;
n is from 1 to 4;
p is from 1 to 4; and
y is from 1 to 4.

4. The electrical conduit of claim 3, wherein the phosphinate is a salt of dimethylphosphinic acid, ethylmethylphosphinic acid, diethylphosphinic acid, methyl-n-propylphosphinic acid, methane-di(methylphosphinic acid), ethane-1,2-di(methylphosphinic acid), hexane-1,6-di(methylphosphinic acid), benzene-1,4-di(methylphosphinic acid), methylphenylphosphinic acid, diphenylphosphinic acid, hypophosphoric acid, or a mixture thereof.

5. The electrical conduit of claim 1, wherein the organophosphorous flame retardant is a polyphosphate having the following general formula:

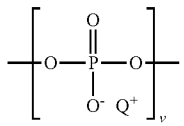

v is from 1 to 1000; and

Q is a nitrogen base.

6. The electrical conduit of claim 5, wherein the nitrogen base is a triazine in which one or more of the carbon atoms in the ring structure are substituted by an amino group.

7. The electrical conduit of claim 5, wherein the nitrogen base is melamine.

8. The electrical conduit of claim 1, wherein organophosphorous flame retardants constitute from about 1% by weight to about 40% by weight of the thermoplastic composition.

9. The electrical conduit of claim 1, wherein the fire-resisting system includes an inorganic compound.

10. The electrical conduit of claim 9, wherein the inorganic compound includes an inorganic molybdate.

11. The electrical conduit of claim 10, wherein the weight ratio of organophosphorous flame retardants to inorganic molybdates is from about 0.1 to about 10.

12. The electrical conduit of claim 10, wherein the inorganic molybdate is zinc molybdate.

13. The electrical conduit of claim 10, wherein the inorganic compound includes an inorganic borate.

14. The electrical conduit of claim 1, wherein the fire-resisting system further comprises a nitrogen-containing synergist.

15. The electrical conduit of claim 1, wherein the fire-resisting system further comprises a fluoropolymer.

16. The electrical conduit of claim 1, wherein the thermoplastic composition further comprises an impact modifier, aminosilane coupling agent, mineral filler, fibrous filler, lubricant, or a combination thereof.

17. The electrical conduit of claim 1, wherein the thermoplastic composition comprises calcium carbonate.

18. The electrical conduit of claim 1, wherein the polyarylene sulfide is polyphenylene sulfide.

19. The electrical conduit of claim 1, wherein the thermoplastic composition exhibits a Limiting Oxygen Index of about 35 or more, as determined in accordance with ASTM D2863-10.

20. The electrical conduit of claim 1, wherein the thermoplastic composition exhibits an average specific extinction area of about 0.800 m$^2$/g or less, as determined in accordance with ASTM E 1354-11b.

21. The electrical conduit of claim 1, wherein the thermoplastic composition exhibits a maximum average heat of emission of about 150 kW/m$^2$ or less, as determined in accordance with ASTM E1354-11b.

22. The electrical conduit of claim 1, wherein the cable is a communication cable.

23. The electrical conduit of claim 1, wherein the cable is a metal wire.

24. The electrical conduit of claim 1, wherein the jacket is formed from a single layer.

25. The electrical conduit of claim 1, wherein the jacket contains an inner layer and outer layer, wherein the outer layer is formed from the thermoplastic composition.

26. An electrical conduit comprising a jacket that defines a hollow passageway, wherein at least a portion of the jacket is formed from a thermoplastic composition that comprises polyphenylene sulfide and a fire-resisting system, the fire-resisting system comprising a halogen-free polyphosphate flame retardant and an inorganic molybdate or inorganic borate, and wherein the thermoplastic composition has a melting temperature of from about 200° C. to about 500° C., wherein the thermoplastic composition exhibits a peak heat release rate of 200 kW/m$^2$ or less, as determined in accordance with ASTM E1354-11b.

27. An electrical conduit comprising a jacket that defines a hollow passageway, wherein at least a portion of the jacket is formed from a thermoplastic composition that comprises a polyarylene sulfide and a fire-resisting system, the fire-resisting system comprising an organophosphorous flame retardant, and wherein the thermoplastic composition has a melting temperature of from about 200° C. to about 500° C., wherein the thermoplastic composition exhibits an average specific extinction area of about 0.800 m$^2$/g or less, as determined in accordance with ASTM E1354-11b and/or a maximum average heat of emission of about 150 kW/m$^2$ or less, as determined in accordance with ASTM E1354-11b.

28. The electrical conduit of claim 27, wherein polyarylene sulfides constitute from about 30% by weight to about 90% by weight of the composition, and wherein the fire-resisting system constitutes from about 1% by weight to about 40% by weight of the composition.

29. The electrical conduit of claim 27, wherein organophosphorous flame retardants constitute from about 1% by weight to about 40% by weight of the thermoplastic composition.

30. The electrical conduit of claim 27, wherein the fire-resisting system includes an inorganic compound.

* * * * *